(12) United States Patent
Hovorka et al.

(10) Patent No.: US 6,504,633 B1
(45) Date of Patent: *Jan. 7, 2003

(54) ANALOG AND DIGITAL ELECTRONIC RECEIVERS FOR DUAL-USE WIRELESS DATA NETWORKS

(75) Inventors: George B. Hovorka, Rowley, MA (US); Steven B. Leeb, Belmont, MA (US); Deron Jackson, San Jose, CA (US); Elmer C. Lupton, Boston, MA (US)

(73) Assignee: Talking Lights, Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/292,126

(22) Filed: Apr. 14, 1999

Related U.S. Application Data (60) Provisional application No. 60/081,866, filed on Apr. 15, 1998, provisional application No. 60/108,287, filed on Nov. 13, 1998, and provisional application No. 60/115,374, filed on Jan. 11, 1999.

(51) Int. Cl.[7] .............................................. H04B 10/10
(52) U.S. Cl. ....................... 359/142; 359/141; 359/172; 359/152
(58) Field of Search ................................ 359/141, 142, 359/144, 145, 152, 172, 161

(56) References Cited

U.S. PATENT DOCUMENTS

| | | | |
|---|---|---|---|
| 3,156,826 A | 11/1964 | Mutschler | |
| 3,194,965 A | 7/1965 | Ruff et al. | |
| 3,900,404 A | 8/1975 | Dachs | 250/199 |
| 4,199,261 A | 4/1980 | Tidd et al. | 356/448 |
| 4,493,114 A | 1/1985 | Geller et al. | 455/617 |
| 4,540,243 A | 9/1985 | Fergason | 350/337 |
| 5,020,155 A | 5/1991 | Griffin et al. | 455/617 |
| 5,363,020 A | 11/1994 | Chen et al. | 315/209 R |
| 5,424,859 A | 6/1995 | Uehara et al. | 359/152 |
| 5,550,434 A | 8/1996 | King et al. | 315/160 |
| 5,598,326 A | 1/1997 | Liu et al. | 363/34 |
| 5,616,901 A | 4/1997 | Crandall | 235/379 |
| 5,623,358 A | 4/1997 | Madey | 359/172 |
| 5,635,915 A | 6/1997 | Gray | 340/825.57 |
| 5,657,145 A | 8/1997 | Smith | 359/181 |
| 5,687,136 A | 11/1997 | Borenstein | 367/116 |
| 5,757,530 A | 5/1998 | Crandall, Jr. | 359/182 |
| 6,198,230 B1 * | 3/2001 | Leeb et al. | 315/224 |

FOREIGN PATENT DOCUMENTS

| | | |
|---|---|---|
| DE | 196 07 468 | 2/1996 |
| EP | 0 456 462 | 5/1991 |
| JP | 60-32443 | 8/1983 |
| JP | 1-122220 | 5/1998 |
| WO | WO 95/11558 | 4/1995 |
| WO | WO 98/02846 | 1/1998 |

OTHER PUBLICATIONS

Wilkins, et al. "Fluorescent lighting, headaches and eye-strain," Lighting Res. Technol., vol. 21(1); pp. 11–18 (1989).
Buffaloe "Fluorescent Lamp Optical Communication Scheme," MIT Dept. of Electrical Engineering & Computer Science, Thesis, pp. 1–49, May 28, 1996.
Buffaloe, et al. "Fiat Lux: A Fluorescent Lamp Transceiver," MIT Paper, Feb. 1997.
Jackson, et al. "Fiat Lux: A Fluorescent Lamp Transceiver," IEEE Transactions on Industry Applications, vol. 34, No. 3, pp625–630, May/Jun. 1998.
Light Beam Communicator advertisement, Ramsey Electronics, Inc., Feb. 11, 1999.

* cited by examiner

Primary Examiner—Leslie Pascal
(74) Attorney, Agent, or Firm—Choate, Hall & Stewart (57) ABSTRACT

Transceiver system including a transmitter and receiver. The transmitter transmits radiation having a varying operating frequency. It is preferred that the radiation be visible light. The operating frequency is varied in a way that eliminates visible flicker. A receiver receives the encoded radiation, decodes the coded data, and delivers the decoded data signal to an output stage. The output may be audio information textural information or graphical information. A two level coding scheme is preferred.

19 Claims, 8 Drawing Sheets

ANALOG AND DIGITAL ELECTRONIC RECEIVERS FOR DUAL-USE WIRELESS DATA NETWORKS

This application claims priority on Provisional application Nos. 60/081,866 filed Apr. 15, 1998; 60/108,287 filed Nov. 13, 1998 and 60/115,374 filed Jan. 11, 1999.

FIELD OF THE INVENTION

The present invention relates to the simultaneous dual use of radiation, e.g., visible light, received from a transmitter, for both a conventional application, e.g., illumination, combined with the additional application of receiving information over a wireless media. The present invention further relates to electronic circuits capable of receiving information-bearing transmissions from a "dual use" transmitter and decoding or presenting the information to a user. The present invention further relates to the presentation of this data as an audio signal. The present invention further relates to the presentation of this data as a text or graphical signal. The present invention further relates to the presentation of this data as any digital or analog information signal for another electronic circuit or electronic or electromechanical system. The present invention further relates to schemes for efficient receiving and decoding of transmitted signals designed to maximize the bandwidth or information transfer capability of the optical data channel. The present invention further relates to the construction of receivers for the detection of modulated information in transmitted light.

BACKGROUND OF THE INVENTION

A communication network is a means for conveying information from one place to another. The information can be digital data, audio, video, text, graphics, data, sign language, or other forms. Establishing and maintaining communication networks is one of the oldest known activities of mankind, ranging from the shouting and drum signals of prehistory through written messages, signal flags, signal fires, smoke signals, signal mirrors, heliographs, signal lanterns, telegraphs, radios, telephones, televisions, microwave signals, linked computers and the internet. Improving communication networks, and finding new, inexpensive ways to meet the growing demand for transmission capability will continue to be a major technical focus in the future. We have developed a communication network that makes "dual use" of sources of radiated transmissions. One implementation of this communication network, such as a wide bandwidth intranet, uses conventional light fixtures, like fluorescent lights, as transmitters. Information is encoded in the lamp light by modulating the electric lamp current with an information signal. If the modulation is done with care, the lamp continues to emit light with no perceptible visual flicker to the human eye. However, an electronic circuit or receiver can be used to decode information in the transmitted light. The lights continue to serve their primary function as a source of illumination, while simultaneously creating a wireless optical data path for information transmission. The purpose of this invention is to disclose efficient means for creating a receiver that decodes information in the lamp light with the highest possible bandwidth or information carrying capacity over the transmitted channel. While the focus of this discussion is on visible lighting systems, it is understood that the dual use transceiver concept could be applied to any system that employs electromagnetic radiation, e.g., a RADAR set, for some purpose and which could also be simultaneously modulated to provide information transmission capability.

This invention is the first to propose establishing a transceiver system using any radiating transmitter with dual utility where the primary utility is any application, not just illumination but also possibly range finding, lane marking, or other applications, and the secondary utility is communication. This invention is the first to propose the transmission of bandlimited analog information such as audio signals by using frequency modulation, which enhances the noise immunity and available bandwidth over previous schemes while specifically avoiding sensory perceptible flicker in the transmission. It is the first to propose the efficient transmission of digital data using pulse code frequency modulation, and also the first to propose encoding digital bits in sidebands around the carrier frequency of the transmitter. It is the first to propose the use of a nonlinear detector in a dual-use network receiver to improve settling and detection time of pulse-coded data. These schemes for the transmission and reception of digital data substantially enhance the available data transmission rate in comparison to schemes in the prior art, again while elimination perceptible flicker. It is the first to disclose schemes for creating multiple data transmission channels using the same transmitter, and the first to propose a receiver in a "dual-use" network capable of selecting one channel from a spectrum of available choices. It is the first to propose a receiver with variable "lock-in" or transmitter capture characteristics, allowing the tailoring of the behavior of the receiver as it locks on to different transmitters. This feature could be especially important for optimizing the receiver's behavior in way-finding applications, and in environments with many different closely spaced transmitters, to ease the process of acquiring and holding a data channel between the transmitter and receiver.

There have been a few reports of the use of visible lighting as a carrier in electronic communication networks. The earliest reference to using lighting to send electronic information as well as to provide illumination appears to be Dachs (U.S. Pat. No. 3,900,404) disclosing an analog amplitude-modulation (AM) scheme to modulate the arc current in a fluorescent lamp, the "carrier" signal, with an audio information signal. King, Zawiski and Yokoun (U.S. Pat. No. 5,550,434) disclosed an updated electronic circuit that also provides for AM modulation of the arc current with an analog signal. Smith (U.S. Pat. No. 5,657,145) teaches a method for encoding low-bandwidth digital information into the lamp light using a pulsed AM technique. The encoding technique involves chopping 100 microsecond slices of current out of the arc waveform. Nakada (Japanese Patent application 60-32443, Feb 19, 1985.) reports the use of FM modulation and a frequency shift keying (FSK) scheme to transmit digital data using visible lighting. Gray (U.S. Pat. No. 5,635,915 Jun. 3, 1997 and PCT WO90/13067, Oct. 11, 1991.) has reported a phase modulated (PM) product pricing system for supermarket shelf labels where a signal is sent from visible lighting to individual product price labels on shelves to cause the listed prices to change when desired.

Other communication schemes have been proposed that do not use the lamp light as the carrier, but instead use the lamp fixture as an antenna for transmitting conventional radio wave or microwave signals. In Uehara and Kagoshima (U.S. Pat. No. 5,424,859), for example, the inventors disclose techniques for mounting a microwave antenna on the glass surface of fluorescent and incandescent lamps. Buffaloe, Jackson, Leeb, Schlecht, and Leeb, ("Fiat Lux: A Fluorescent Lamp Transceiver," Applied Power Electronics Conference, Atlanta, Ga., 1997) first outlined the possibility of using pulse-code modulation to transmit data with a fluorescent lamp. In the latter reference, a three-level code shifts the arc frequency to one of three possibilities every 2 milliseconds. The result is a steady light output, on average, with no perceptible flicker. This transceiver set relies on an encoded clock embedded in the three-level, transmitted waveform to synchronize the decoding process in the receiver. We have developed a dual-use transceiver system that can transmit and receive frequency modulated transmissions carrying either analog or digital data. Our experiments confirm that frequency modulated (FM) transmissions provide the best signal recovery properties in a dual-use transceiver employing, for example, fluorescent lamps as a transmitter. We have found that, with care in the design of the transceiver set, analog signals in the audio frequency range can be used to frequency modulate fluorescent lamps without causing flicker visible to the human eye in the transmitted light. For digital data signals that could include text, graphics, or other information, we have unexpectedly and fortuitously found that a two value coding, such as Manchester encoding, also allows binary bits to be transmitted with no observable flicker regardless of the nature of the data strings. We will refer to this modulation as "two level coding."

We have designed receivers to decode both analog and also digital waveforms from transmitted lamp light. These receivers maximize the available bandwidth of the communication channel. They also incorporate unique and novel features to ensure a variety of desirable features in the receiver. For example, the receiver can be designed to provide an indication of "lock-on" to an available transmitter, and can be designed to provide gradual or abrupt fading of the information signal presented to a user as a source becomes available or moves away. A gradual acquisition, for example, could be invaluable in using the transceiver set for direction finding. A more abrupt localization of the transmission source may be best in a transmitter-rich environment with many different competing signal sources.

SUMMARY OF THE INVENTION

In one aspect, the transceiver includes a transmitter for transmitting coded data band limited to avoid visually perceptible flicker by varying the operating frequency of a source of radiation having a primary and secondary utility. Visually perceptible flicker would be considered "application unacceptable" flicker in a dual-use transceiver set employing visible light transmitters. Other applications, e.g., a radar set dual-use transmitter, might define application unacceptable flicker in different ways, e.g., flicker that interferes with radar detection. Generally, "application unacceptable" flicker occurs when variations due to the secondary utility interfere with the first, or vice-versa. The system includes a receiver for receiving the encoded radiation, decoding the coded data and delivering the decoded data signal to an output stage. It is preferred that the receiver include adjustable lock-in characteristics and have a non linear detector to optimize reception performance. The receiver may also include internal data storage in which stored data can be cued by signals from the transmitted radiation. It is also preferred that the receiver include an adjustable detector to lock on to different transmitted channels or carrier waves.

The output stage may produce an audio output, text output or a graphical output. The receiver may also include a split or multi-window graphical output or display for displaying multiple data sources or synchronized data windows, for example, for text and a translation thereof. The receiver may include a digital data output or computer interface or have a graphical output or display for presenting sign language. It is also preferred that the data is sideband encoded digital data or orthogonal block frequency code data other than tri-level coding.

In particular the present invention pertains, in part, to electronic circuits capable of receiving radiated transmissions, e.g., light from a fluorescent lamp. The circuits further include means to sense light. The circuits further include means to detect changes in the frequency of the flickering of the light, where this flickering may be invisible to the human eye. The circuits further include means to demodulate the flickering to recover a signal from the transmission source. The circuits further include means to present this signal as analog data, e.g., an audio signal. The circuits further include means to detect discrete levels in the signal, and to decode these levels to reproduce a digital data or bit stream from the transmitter.

By "lamp", as that term is used herein, it is meant a device that produces radiated transmissions, including, but not limited to, infra-red, visible, and ultra-violet light, in response to an input electrical current which flows in the lamp. A typical example is a fluorescent lamp, although other types, such as high-intensity discharge lamps, light emitting diodes, gas and solid state lasers, particle beam emitters, cathode ray tubes, liquid crystal displays, electroluminescent panels, klystrons, and masers, are also intended. Emitters of other types of radiation, such as radio antennae for applications in RADAR sets, ultrasonic transducers and mechanical blowers ("radiating" air or water, for instance), for example, are also intended.

By "transmitter", as that term is used herein, it is meant a circuit in combination with a lamp that controls the flicker frequency of the radiated output of the lamp.

By "receiver", as used herein, it is meant a circuit that takes as input a radiated transmission from a transmitter and that detects and presents information in the transmission, including, but not limited to, audio, text, graphical, and raw digital data signals.

By "sensor", as used herein, it is meant an electrical component or sub-circuit in the receiver that is capable of observing and responding to radiated transmissions. The sensor could respond, for example, by providing an electrical signal that varies according to variations in the transmitted radiation.

By "amplifier", as used herein, it is meant an electrical component or sub-circuit in the receiver that produces a scaled copy of the input waveform at the output of the amplifier. The scale factor relating the input and output is called the gain of the amplifier or simply the gain. The amplifier might include automatic-gain control capability to produce an output with constant mean or peak amplitude in the face of variations in the mean or peak amplitude of the input signal.

By "filter", as used herein, it is meant an electrical component or sub-circuit in the receiver that produces an output waveform that contains a limited range or band of the frequency content of the input waveform. Typical examples include low, high, and band pass filters.

By "detector", as used herein, it is meant a component or sub-circuit in the receiver that takes an input signal that consists of a carrier wave modulated by an information signal. The carrier wave could be modulated by any means, including frequency, amplitude, or phase modulation. The detector produces an output waveform that reproduces the information in the modulating information signal.

By "decoder", as used herein, it is meant a component or sub-circuit in the receiver that takes an input signal that contains information of interest, possibly in an encoded or encrypted form. Encryption could be employed in the transmitted data, to ensure security, and compression might be used to increase the effective data transmission rate. The decoder produces an output electrical waveform that reverses the encoding, e.g., encryption and/or compression, producing, for example, an output waveform consisting of useful binary voltage levels. By "output stage", as used herein, it is meant a component or sub-circuit in the receiver that presents information to the user of the receiver in a convenient form. For example, the output stage could incorporate an amplifier and a headset to provide an audio signal of interest to the user. As another example, the output stage could take a demodulated and decoded digital information waveform as input and produce a text or graphics display. As another example, the output stage could accept commands in the demodulated and decoded input waveform and, in response to these commands, cue the presentation of stored audio, textual, graphical, or other information from a memory, disk, or other storage component in the output stage.

In one embodiment of the invention, a transceiver system is deployed that consists of an optical transmitter and receiver. The transmitter modulates the flicker (variations in intensity) frequency of the light output of a fluorescent lamp fixture. Transmission is accomplished by modulating or varying the frequency of the alternating current in the fluorescent lamp. In one typical application, the modulating signal is an audio voice recording that has been carefully bandlimited to a frequency range of 200 Hz to 3000 Hz. This ensures that the modulating signal will not create significant harmonic components in a frequency range detectable to the human eye. Light from the lamp floods an area, e.g., a room, with illuminating light that is flickering above the human visual perception range, i.e, the lamp light appears steady. The optical receiver recovers information from the light, similar in concept to the way a radio recovers signals from radio waves. In this case, however, the receiver is part of a "dual-use" network, in which the light serves not one purpose, as radio waves do in the case of a radio transceiver set, but rather two purposes: illumination and information transmission.

An optical sensor is employed in the receiver. This sensor is sensitive to light in the infra-red and visible light ranges. The sensor is capable of clearly resolving the flickering of the light, even though the flickering is above the human visual perception range. Note that, if the arc frequency varies over a particular frequency range, e.g., 38 to 40 kHz, the received intensity varies from 76 to 80 kHz because the intensity of the light varies with the magnitude and not the direction of the arc current. A selective bandpass filter follows the output of the sensor. This filter ensures that detected signals in the flicker frequency range are passed, while other frequency components are rejected. An amplifier may be employed before, after, or before and after the filter to condition the detected signal level.

A phase-locked loop (PLL) circuit can be employed as a detector to demodulate the FM transmission. The output of the loop filter of a properly tuned PLL circuit will correspond to the modulating information signal at the transmitter. This signal is directly useful, requiring no decoding, and can be directly passed to the output stage that consists of an audio amplifier and headset. A user can hear the broadcast audio messages over the headset.

In another embodiment, the modulating signal is restricted to a discrete set of frequencies in sidebands around the carrier frequency, i.e., a fixed base frequency for the lamp current. Different sideband frequencies correspond to different discrete tones. The identical sensor, filter, and amplifier could be used as in the previous embodiment to construct a receiver to detect the transmissions. A new detector and decoder could be added to recover the discrete tones, and interpret them as digital bits. These bits could be used to convey text or graphics information to a display, or to send commands to an output stage capable of cueing data for presentation from a storage device integral with the receiver.

In a third embodiment, digital bits could be transmitted using pulse code modulation, in which each "0" or "1" or mark bit corresponds to a specific sequence or pulse code of transmitted frequencies. The identical sensor, filter, and amplifier could be used as in the previous embodiment to construct a receiver to detect the transmissions. A PLL circuit could be used to detect the transmitted frequency levels. If the pulse codes consist of at most two frequency levels, the PLL might be configured to operate nonlinearly, saturating between its high and low frequency loop filter voltage levels, to indicate the transmitted frequency levels. The stream of transmitted frequency levels would be decoded into bits by a decoder circuit, e.g., a finite state machine, programmed to interpret the chosen pulse code as bits. Again, among other uses, these bits could be used to convey text or graphics information to a display, or to send commands to an output stage capable of cueing data for presentation from a storage device integral with the receiver.

BRIEF DESCRIPTION OF THE DRAWINGS

The invention will be understood with reference to the drawings, in which.

DETAILED DESCRIPTION OF THE INVENTION

Figure 1:
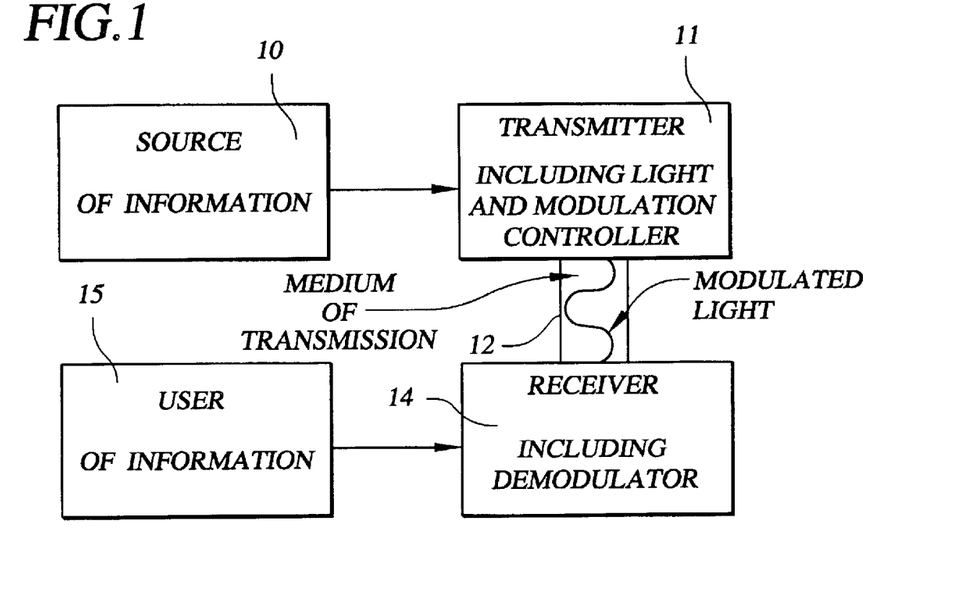
FIG. 1 is a schematic illustration of the transceiver system of the invention.
Figure 2:
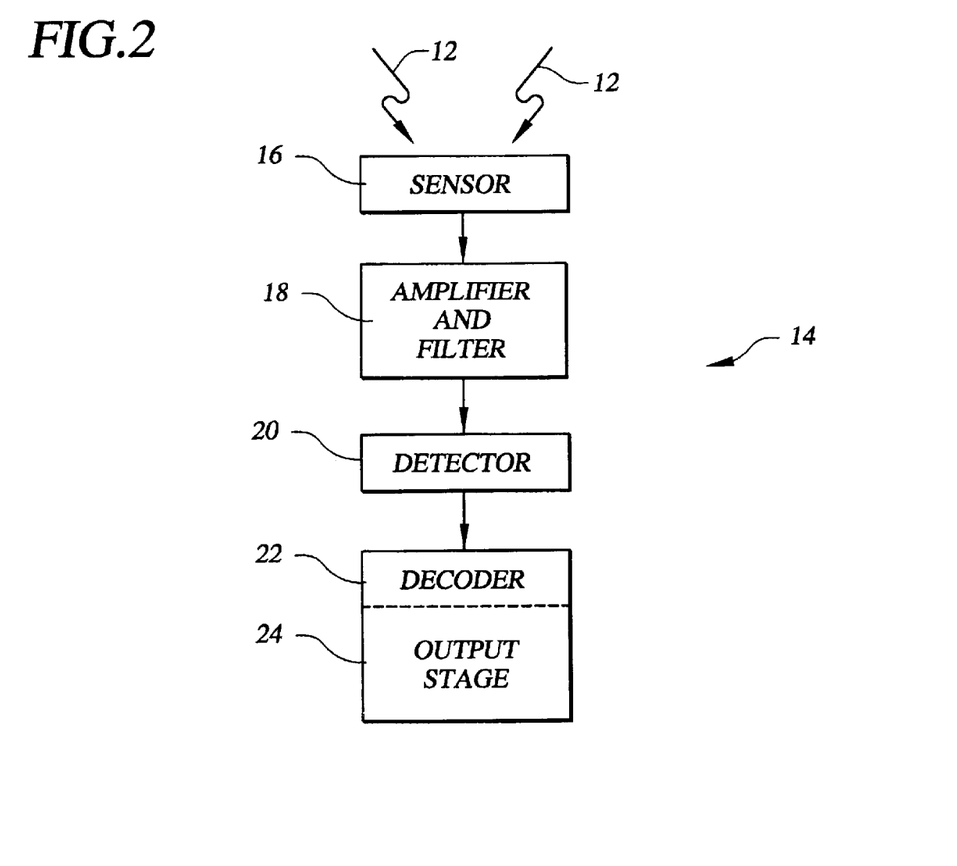
FIG. 2 is a schematic illustration of a receiver for use in the transceiver system.

The present invention involves a transceiver set in which a transmitter transmits coded data by varying the operating frequency of a source of radiation, e.g., an electric lamp and lamp ballast circuit. As shown in FIG. 1, a source of information 10 provides information to a transmitter 11 which generates modulated electromagnetic radiation 12 which, in some embodiments, is visible light. The radiation 12 may, of course, be radiation in any spectral region. A receiver 14 responds to the radiation 12 to generate an output which may be audio, text or graphical information. The information is then used by a user of information 15. With reference now to FIG. 2 the receiver 14 includes a sensor 16 which responds to the radiation 12 to generate an output signal which forms the input to an amplifier and filter section 18. A detector 20 passes a signal to a decoder stage 22 which extracts the information encoded in the radiation 12 and displays it at an output stage 24.

If the signal to be transmitted is an analog AC signal with a minimum frequency content above that of the human visual perception range for flicker and a maximum frequency content significantly below the nominal switch frequency of the inverter, it is sufficient to apply the signal directly to the frequency modulating input of the ballast. See, U.S. Pat. No. 6,198,230 and entitled "Dual-Use Electronic Transceiver Set for Wireless Data Networks" and application Ser. No. 09/291,709 filed Apr. 14, 1999 entitled "Communication System" the teachings of which are incorporated herein by reference. This will directly modulate the lamp current and lamp light, and, because the signal is restricted to avoid very low frequency content (e.g., which is inaudible for audio data anyway), the lamp light will not appear to flicker to the human eye.

To encode a digital or discrete-level message in the lamp light, it is generally not sufficient to simply employ a direct frequency-shift-keying (FSK) scheme. Suppose for example, that we wished to transmit a string of bits, zeros and ones. In a simple FSK scheme a zero bit might be assigned an arc frequency of 36 kHz and a one bit assigned to 40 kHz. In this case, a long run of logic zeros followed by a long run of logic ones would result in a noticeable flicker in light intensity during the transition. Instead, this invention employs coding schemes that ensure that the light will not flicker visibly.

EXAMPLE I

Analog Receiver

Figure 3A:
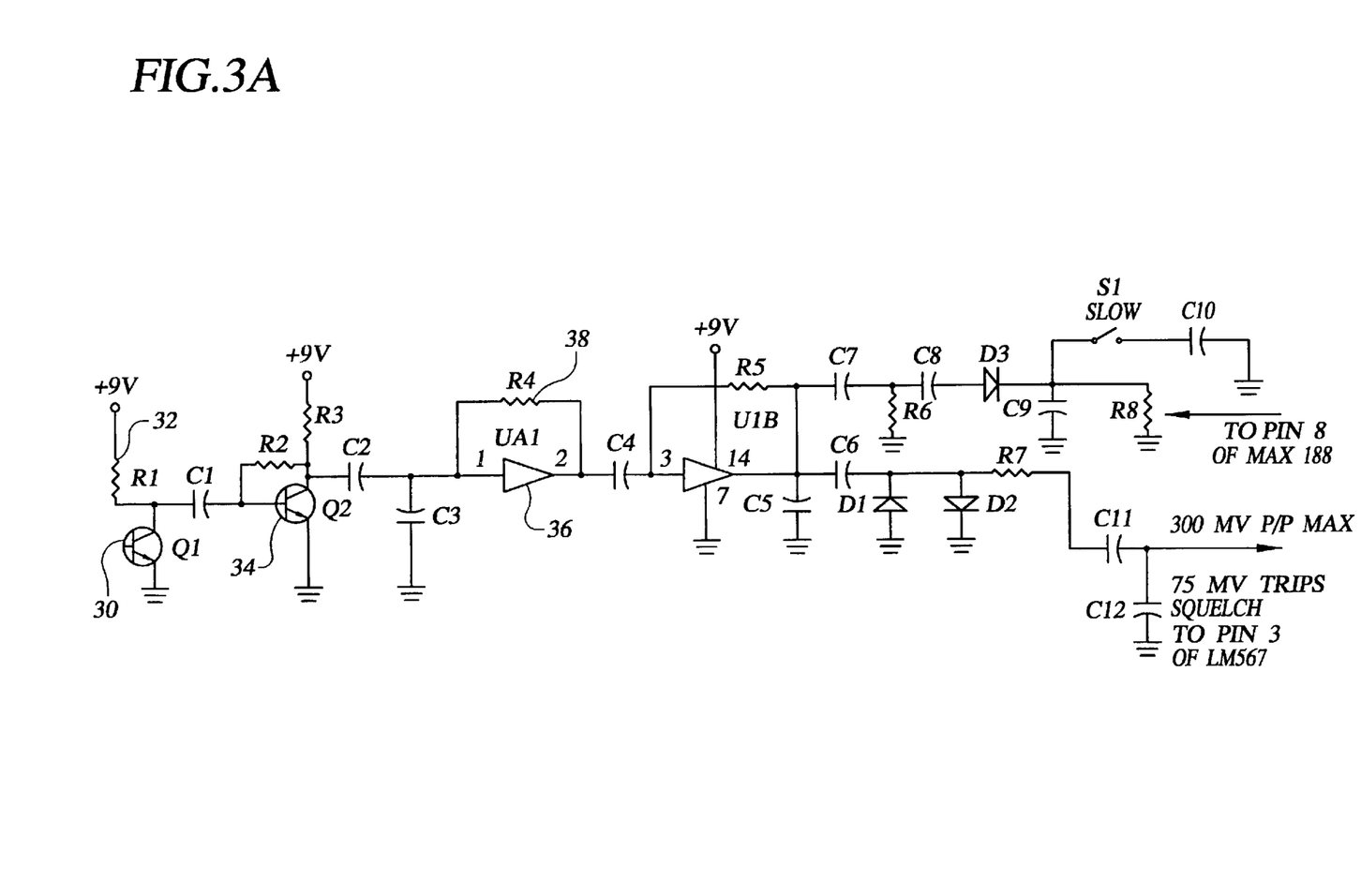
FIG. 3 shows a circuit schematic of a receiver capable of recovering transmitted audio information.
Figure 3B:
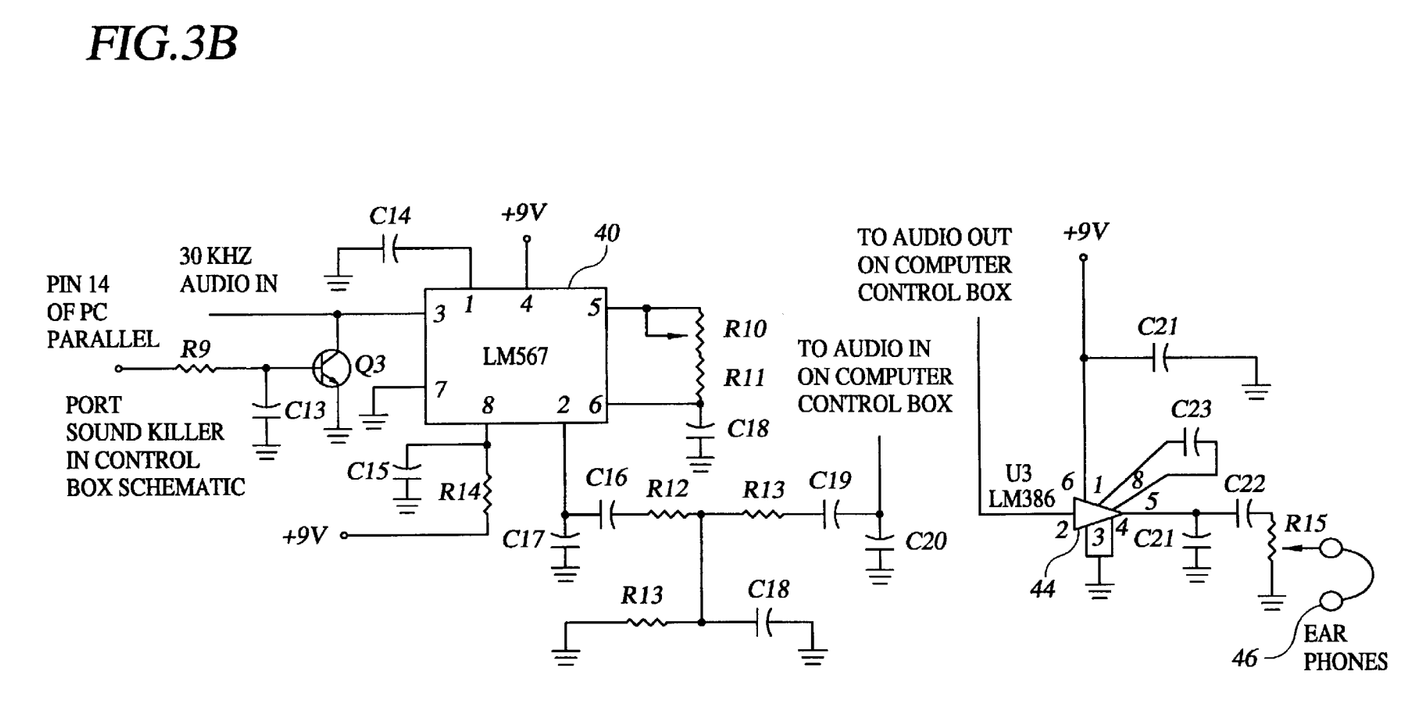
Figure 3C:
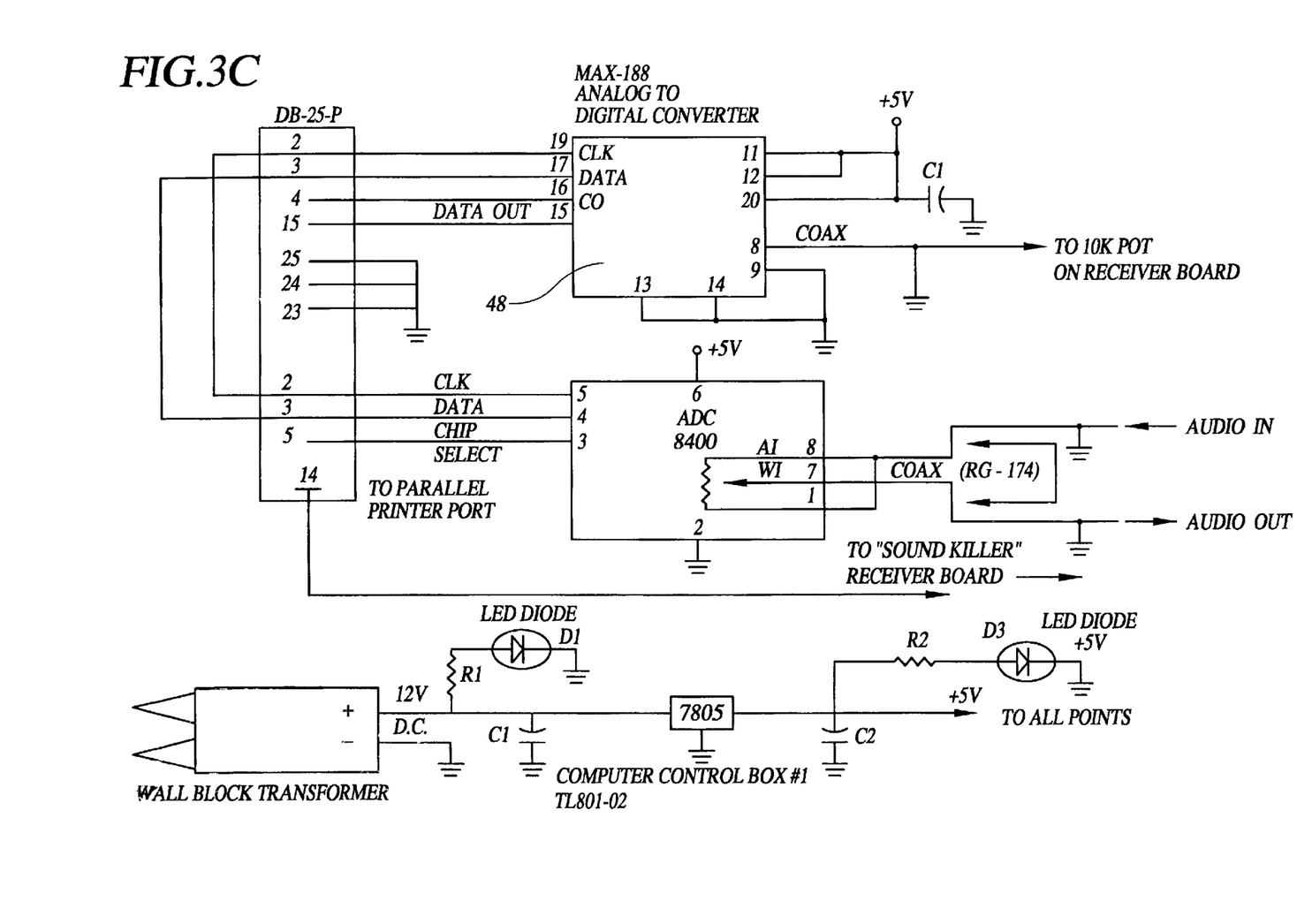

The receiver, shown in FIG. 3, uses as a sensor a type BPE36/QT828 photo transistor 30 biased into conduction with a 27K resistor 32 followed by a 2N3904 amplifier 34 and subsequent high pass filtering. This signal is then fed through two additional gain stages which consist of two gate units from a CD4069 (4069) gate 36 biased into their linear region with 100K resistors 38. The 4069 is both low cost and available in surface mount configuration. The lack of precise gain of these two stages is compensated by the computer gain control system which will be discussed shortly. The signal, having passed through three stages of amplification, is then limited with a pair of silicon diodes and fed into the input of a type LM567 phase lock loop tone detector 40. The type 565 phase lock loop was also evaluated but it was found to be suitable, but no better than the 567 which is significantly cheaper and available in a surface mount configuration.

The loop oscillator in the PLL is adjusted with a panel mounted 10K potentiometer 42 to lock with the incoming signal. Once a lock has been achieved, the demodulated audio is applied to the output stage, an LM386 amplifier 44 driving a headphone 46. If further amplification is required, amplified Walkman™ type speakers are used to bring the signal to room-filling volume.

An important feature of this embodiment is a lock detector used to control the behavior of the receiver in acquiring and presenting a signal to the user. We have found that an adjustable lock characteristic is essential for optimizing the receiver for different applications. For example, the lock characteristics could be set to provide a gradual build-up of output signal strength or volume as the receiver aligns with the transmitter. This approach could be valuable, for example, in using the system for direction finding in a building or other venue. The lock characteristic could also be set to provide no output until a strong transmitted signal was received, in which case the receiver would provide very sharp localization of individual transmitters. This approach could be especially valuable in an environment with many closely spaced transmitters sending different messages. The lock characteristics can be made software programmable, permitting great flexibility in adjusting the characteristics of the receiver.

The lock-in adjustment can be implemented in many ways. In our prototype, an expedient approach was taken, which could be reduced in size and complexity, for example, by employing an on-board, single chip microcontroller in the receiver. In our prototype, the lock-in characteristics of the receiver are controlled with an external computer that is attached to the receiver in the following manner:

1. The output of the third gain stage, prior to limiting, is monitored with a 10 bit analog to digital converter(ADC). In order to turn the radio frequency (RF) signal into DC level, the signal is first passed through a high pass T filter and then rectified with a 1N60 diode and filtered with either a 0.033 uf or 10 uf capacitors which set the time constant of the system. This time constant is switch selectable from the front panel of the computer control box.

2. The current from the diode is passed through a 10K ten turn trim pot which creates a voltage that is analyzed by a MAX188 ten bit converter 48 that is connected to a PC platform computer via the parallel printer port. The data is analyzed and treated in two different manners depending on the signal amplitude as determined by the ADC:

If the DC level is below a preset threshold, pin 14 of the parallel printer port is set high which biases into saturation a transistor which is placed in parallel with the input of the LM567 PLL. This prevents the PLL from hunting on weak signals.

Beyond the threshold level increasing DC levels at the input to the ADC and translated into decreasing resistance values for a Analog Devices type ADC8400, 256 step digital trim pot that is placed in the audio stream between the output of the PLL and input to the LM386.

The algorithm of the software is configured such that for weak signals beyond the initial threshold the volume increases in a linear manner. Beyond the linear region the volume to signal relationship assumes a logarithmic plot such that the volume saturates at strong signal levels.

As the signal decreases the reverse of these three steps occurs.

EXAMPLE II

Digital Receiver

One approach we have used for transmitting digital data is the "sideband FM method," a modification of the approach used to transmit and receive analog signals. Two different frequency values of sidebands around the arc current center frequency are used to represent the binary values. Since the two sidebands are shifted equal but opposite amounts around the carrier or center frequency, the average frequency remains the same and no flicker is observed. Different sidebands are keyed into the lamp light to transmit different bit or logic levels. The receiver is similar to the one employed in Example I. Now, however, the output consists of a discrete number of tones or notes encoded in the sidebands, which can be interpreted as digital bits or data.

EXAMPLE III

Digital Receiver

Figure 4:
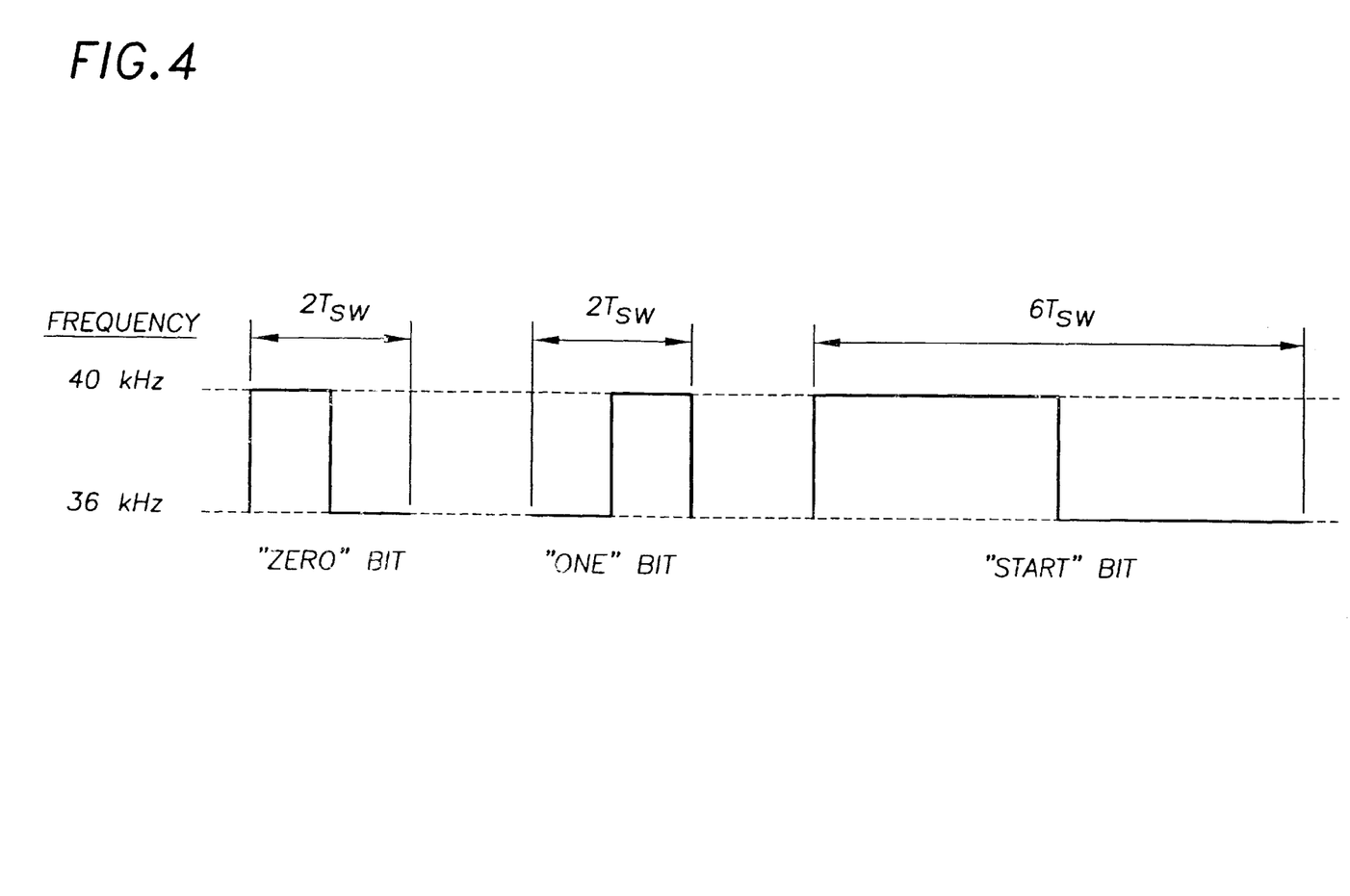
FIG. 4 shows a half-weight bit pattern.

Another method for transmitting digital data involves shifting the base frequency of the light, but using a coding scheme more complex than a simple binary code to represent the signal. The prior art reports a three level code being used with each binary bit being represented by three different frequencies of the light. In this way, the average frequency remains the same. Unexpectedly and fortuitously, we have found that a two value coding, such as Manchester encoding, also allows binary bits to be transmitted with no observable flicker regardless of the nature of the data strings. We will refer to this modulation as "two level coding." For example, in one of our prototypes, a two-level half-weighted coding scheme was used to eliminate visible flicker while transmitting digital data. The two level coding is based on Manchester coding, which is common in computer networks. It is employed to additional advantage in this invention to eliminate visible flicker. Manchester coding is one of a class of half-weight block codes that are suitable for this application (E. Bergmann, A. Odlyzko, and S. Sangani, "Half Weight Block Codes for Optical Communications," *AT&T Technical Journal*, Vol. 65, No. 3, May 1986, pp. 85–93, the teachings of which are incorporated herein by reference). This two-level code shifts the arc frequency every $T_{SW}$ seconds, where a typical value is $T_{SW}$=2 milliseconds. A one or a zero bit does not correspond to a particular arc frequency, but rather, to a two-level pattern in arc frequency. The patterns are illustrated in FIG. 4. Logic one and zero bits are transmitted by patterns of length $2T_{SW}$, and a unique start bit, used to demarcate the beginning of a transmitted byte, is represented by a sequence $6T_{SW}$ in length.

Figure 5A:
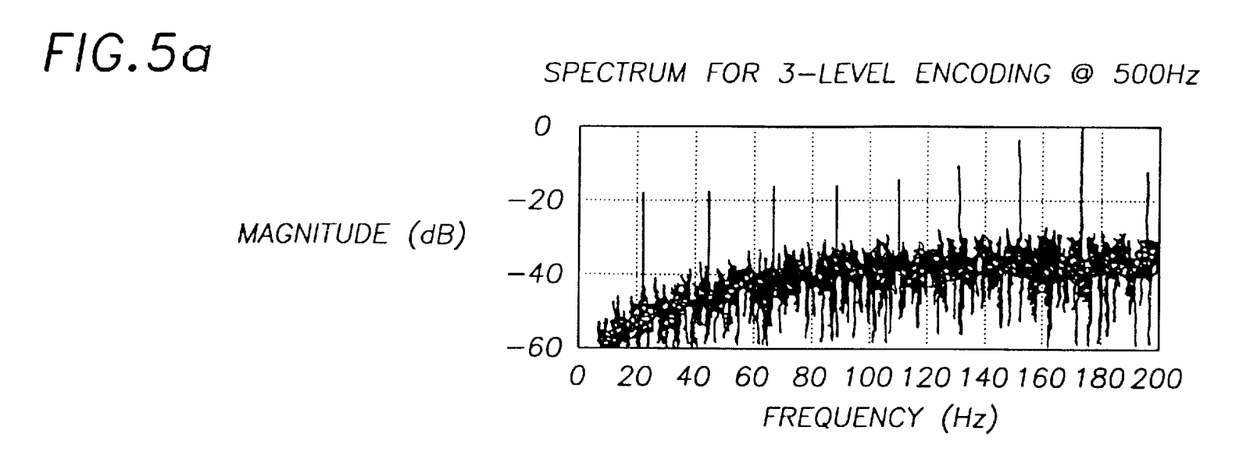
FIGS. 5a and 5b show a spectrum comparison showing the advantage of half-weight bit coding.
Figure 5B:
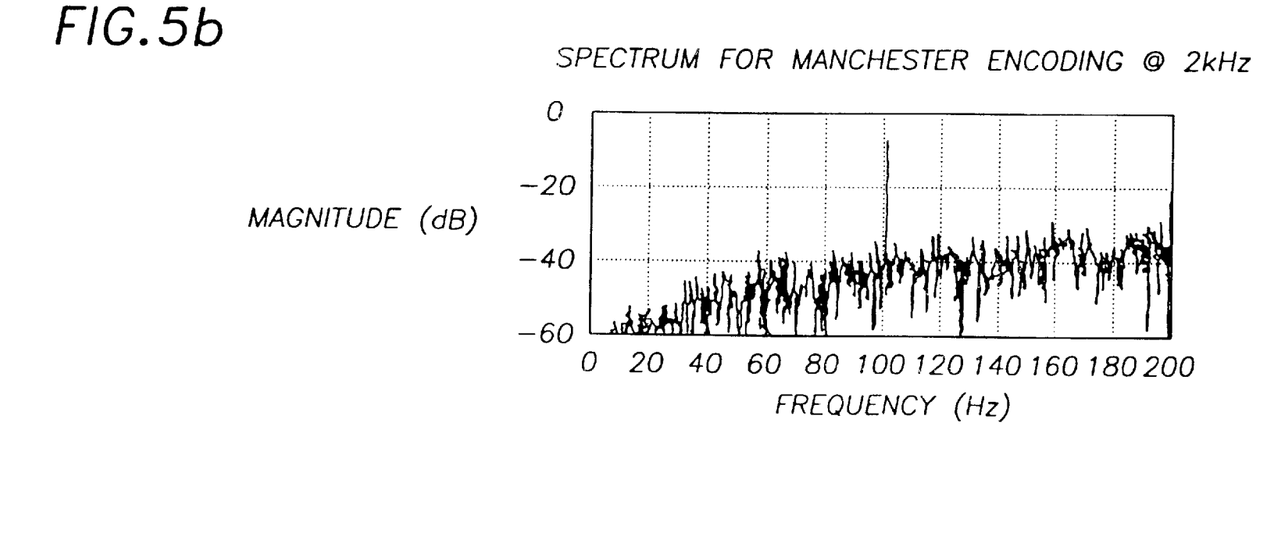

The two level patterns for the zero, one, and start bits have the same average frequency. Thus, for sufficiently rapid switching between the different arc frequencies, i.e., for a sufficiently short interval $T_{SW}$, the lamp exhibits no perceptible flicker, even during transitions between long sequences of zeros and ones. FIG. 5b shows the approximate frequency spectrum of the lamp intensity for the Manchester encoding scheme. The three-level encoding scheme described in Buffaloe, above, is included for comparison in FIG. 5a. The vertical axes, in decibels, are normalized with respect to the largest magnitude AC component. The spectrums were calculated assuming linear changes in intensity with frequency and a random stream of message data. The spectrums provide good qualitative estimates of the significant low-frequency components in the light output. FIG. 5a shows intensity variations at multiples of 22 Hz for the three-level coding scheme. The lower frequency components at 22 Hz and 44 Hz are frequencies which might be perceptible to the human eye. FIG. 5b shows the predicted spectrum using the new Manchester coding. The first significant component in this spectrum appears at 100 Hz, which is already above the range of human perception.

Figure 6:
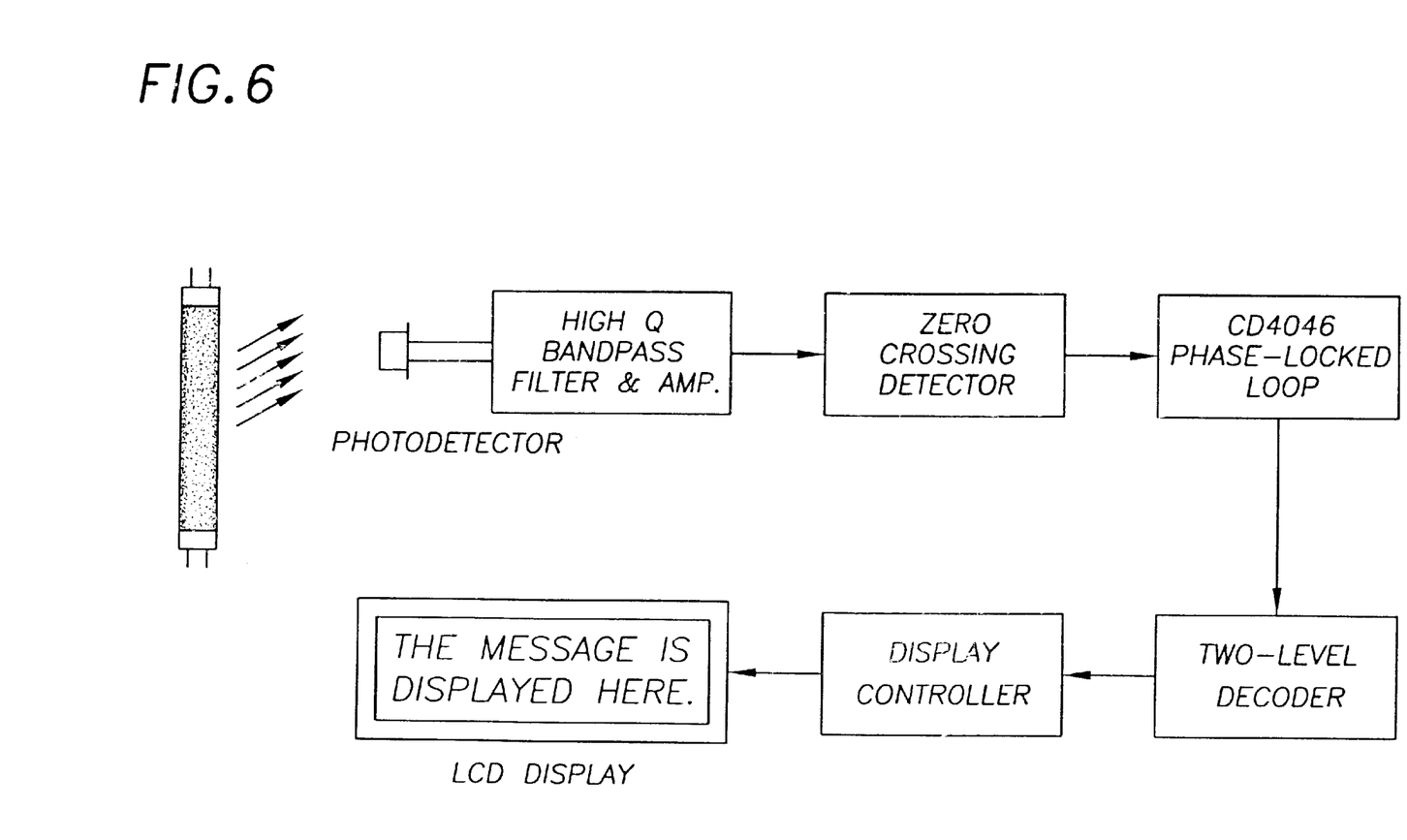
FIG. 6 shows a receiver architecture for decoding digital data transmitted by the light.

The modulated lamp light is detected and decoded by a receiver circuit. This receiver may take the form of a portable device where received information is displayed on a liquid-crystal display (LCD) as shown in FIG. 6. A photodetector is used to detect the light output of the fluorescent lamp. To help reject background variations in the ambient environment which are not caused by the operation of the transmitter, the photodetector signal is first passed through an analog bandpass filter and amplifier in the receiver. Note that, while the arc frequency varies from 36 to 40 kHz, the received intensity signal varies from 72 to 80 kHz because the intensity varies with the magnitude and not the direction of the arc current. Zero crossings in the intensity signal are located using a comparator, and the frequency is tracked by a CD4046 phase-locked loop (PLL).

The non-linear operation of the PLL loop is critical to the increased performance of this invention. A conventional PLL circuit uses a feedback structure to track and output a voltage proportional to the frequency of an received signal. The performance of such a circuit can be accurately modeled, for small signal changes, as a linear system. The characteristics of the resulting linear system, such as its damping and settling time, affect the achievable data rate of the receiver system. This invention significantly improves the performance of the PLL tracking performance in this application. This is accomplished by driving the PLL feedback loop into saturation at each of the received frequency limits. This establishes a situation where the PLL output voltage reaches saturation much faster than the settling time of the associated linear system.

Figure 7A:
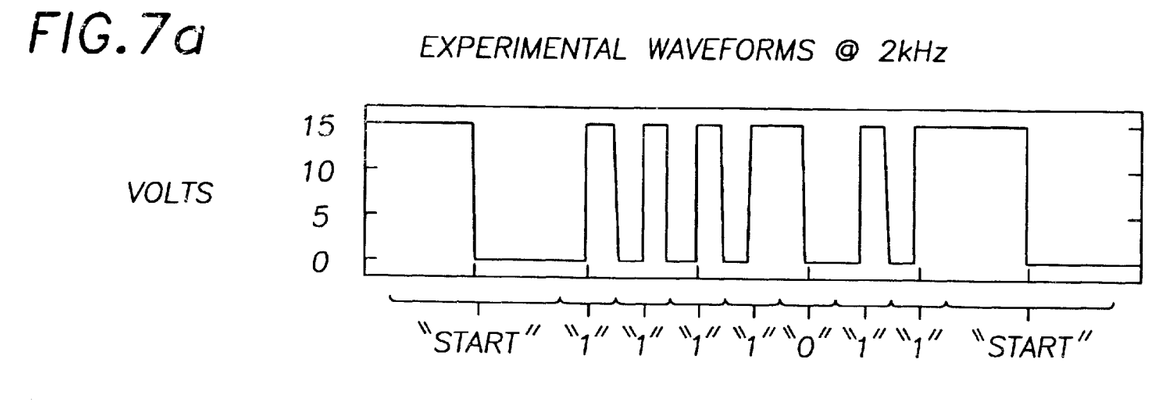
FIG. 7 shows a comparison of sent and received encoded bits in a prototype system.
Figure 7B:
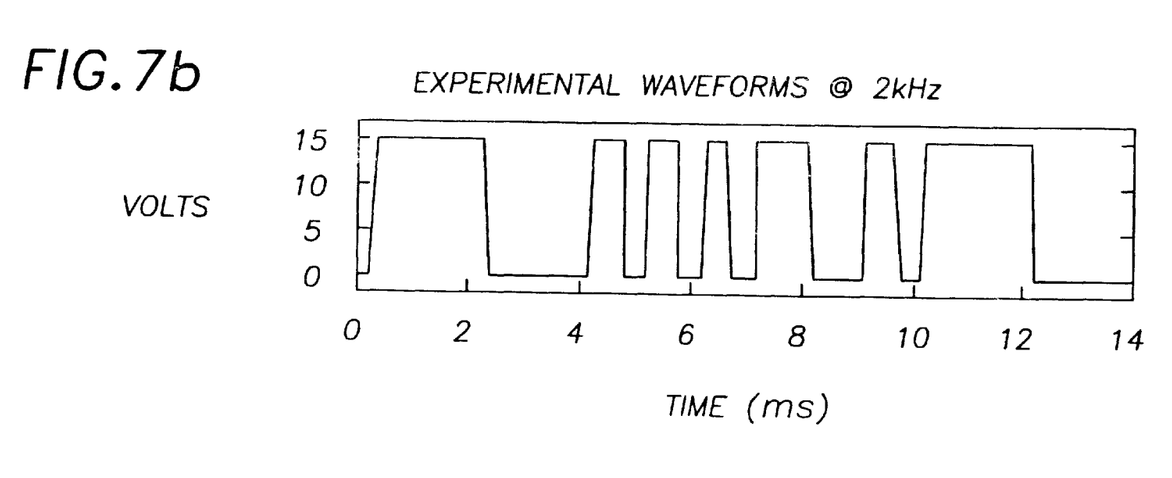

The non-linear behavior of the receiver is illustrated in FIGS. 7a and 7b. The figures show operating waveforms from an experimental prototype system. FIG. 7a shows the transmitter waveform that is used to modulate the frequency of the fluorescent lamp ballast, zero volts corresponds to a frequency of 36 kHz and 15 volts corresponds to 40 kHz. FIG. 7b shows resulting output of the PLL using the non-linear saturating feedback loop. The output very accurately tracks the frequency changes in the lamp light with virtually none of the settling characteristics of a typical PLL.

Decoding of the Manchester-encoded data is accomplished asynchronously by oversampling the comparator outputs and inspecting the received pulse widths. This makes the task of decoding the half-weight code more challenging than that of decoding the tri-level scheme published in T. Buffaloe, D. Jackson, S. Leeb, M. Schlecht, and R. Leeb, "Fiat Lux: A Fluorescent Lamp Transceiver," *Applied Power Electronics Conference*, Atlanta, Ga., June 1997. However, the improved data transmission rate of the half-weight scheme, and the ready availability of commercial single-chip decoders for half-weight coded data, make the half-weight codes highly attractive for this application.

In our text transceiver prototype shown in FIG. 6, a display controller stores the decoded information and periodically updates the incoming message on a two-line, liquid crystal display. In general the received digital data stream could be used to deliver a visual (text) or audio message, or could be processed directly by computer or other information handling system.

The analog and digital half-weight frequency-modulated data-encoding schemes demonstrated here are by no means the only approaches for coding data in the lamp output. Other techniques might be used to improve transmission bandwidth or flexibility. We envision that orthogonal bit patterns could be employed in different lamp ballasts (or the same ballast dependent on a transmission "key code") to permit the transmission and reception of data on different channels in the same local area. One channel could be used, for instance, to provide location information, while another might be used for direct person-to-person paging. It is also possible to operate a lamp with multiple carriers, or a light fixture containing several lamps with different carrier frequencies for each lamp. In either case, the receivers described in this discussion can be used to selectively lock on to different channels or carrier waves by tuning the detector in the receiver circuit.

It should be realized by those skilled in the art that other, equivalent constructions to implement a transceiver system which provides dual use of a radiation source, e.g., for illumination and also information transmission such as the system shown in FIG. 1, do not depart from the spirit and scope of the invention as set forth in the appended claims.

What is claimed is:

1. Transceiver system comprising:
a transmitter for transmitting coded data at a data rate of 250 bits per second or greater and less than 5 million bits per second by varying the operating frequency of a source of radiation having a primary and secondary utility; and
a receiver for receiving the encoded radiation at a data rate of 250 bits per second or greater and less than 5 million bits per second, decoding the coded data, and delivering the decoded data signal to an output stage, wherein the data is encoded to avoid application unacceptable flicker in the transmitted radiation.

2. The system of claim 1 wherein the receiver is provided with adjustable lock-in characteristics.

3. The system of claim 1 in which sensory perceptible flicker is avoided.

4. The system of claim 3 in which visually perceptible flicker is avoided.

5. The system of claim 1 wherein the receiver includes a non linear detector to optimize reception performance.

6. The system of claim 1 wherein the receiver includes means for internal data storage in which the stored data can be cued by signals from the transmitted radiation.

7. The system of claim 1 wherein the receiver includes an adjustable detector to lock onto different transmitted channels or carrier waves.

8. The system of claim 1 wherein the receiver provides an audio output.

9. The system of claim 1 wherein the receiver provides a text output.

10. The system of claim 1 wherein the receiver provides a graphical output.

11. The system of claim 1 wherein the receiver includes a split or multi-window graphical output for displaying multiple data sources or synchronized data windows.

12. The system of claim 1 wherein the receiver produces a digital output.

13. The system of claim 1 wherein the receiver provides a graphical output for presenting sign language.

14. The system of claim 1 wherein the transmitter transmits data that is band limited to avoid flicker, sideband encoded digital data or orthogonal block frequency code data other than tri-level code data.

15. The system of claim 14 wherein the transmitter transmits data that is band limited to avoid flicker or sideband encoded digital data.

16. The system of claim 1 including transmitter means for compressing data and receiver means for expanding data.

17. The system of claim 1 including transmitter means for encrypting data and receiver means for decrypting data for security.

18. The system of claim 1 wherein the transmitter transmits coded data at a data rate of 1030 bits per second or greater and the receiver receives the encoded radiation at a data rate of 1030 bits per second or greater.

19. The system of claim 1 wherein the data rate is 250 bits per second or greater and 1030 bits per second or less.

* * * * *

UNITED STATES PATENT AND TRADEMARK OFFICE
CERTIFICATE OF CORRECTION

PATENT NO. : 6,504,633 B1 Page 1 of 1
APPLICATION NO. : 09/292126
DATED : January 7, 2003
INVENTOR(S) : George B. Hovorka et al.

It is certified that error appears in the above-identified patent and that said Letters Patent is hereby corrected as shown below:

In the Specification, Page 1, after the title insert the following text:

This invention was made with government support under grants 1R43DC04015 awarded by the National Institutes of Health and other U.S. Government grants and contracts. The government has certain rights in the invention.

Signed and Sealed this

Second Day of December, 2008

JON W. DUDAS
*Director of the United States Patent and Trademark Office*